(12) United States Patent
Kageyama et al.

(10) Patent No.: US 6,644,440 B2
(45) Date of Patent: Nov. 11, 2003

(54) LUBRICATING STRUCTURE FOR OUTPUT SHAFT BEARING PORTION IN TRANSMISSION

(75) Inventors: Isamu Kageyama, Tochigi-ken (JP); Masahiro Imamura, Tochigi-ken (JP); Gaku Ogawa, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 82 days.

(21) Appl. No.: 09/775,554

(22) Filed: Feb. 5, 2001

(65) Prior Publication Data

US 2001/0011616 A1 Aug. 9, 2001

(30) Foreign Application Priority Data

Feb. 8, 2000 (JP) .......................... 2000-030573

(51) Int. Cl.⁷ .................... F01M 1/00; F01M 11/02
(52) U.S. Cl. .................. 184/11.2; 184/6.12; 184/13.1
(58) Field of Search .................. 184/11.1, 11.2, 184/11.3, 11.4, 6.12, 13.1; 74/606 R

(56) References Cited

U.S. PATENT DOCUMENTS

| | | | |
|---|---|---|---|
| 4,745,816 A | * | 5/1988 | Horiuchi et al. ........... 184/6.12 |
| 5,480,003 A | * | 1/1996 | Hill et al. .................. 184/11.2 |
| 5,651,425 A | * | 7/1997 | Hill et al. .................. 184/11.2 |
| 5,904,427 A | * | 5/1999 | Braun et al. ............... 184/13.1 |
| 6,109,393 A | * | 8/2000 | Toyota et al. .............. 184/11.2 |
| 6,223,858 B1 | * | 5/2001 | Ubagai et al. ............. 184/11.1 |

FOREIGN PATENT DOCUMENTS

JP 2-80816 3/1990

* cited by examiner

Primary Examiner—David Fenstermacher
(74) Attorney, Agent, or Firm—Armstrong, Westerman & Hattori, LLP.

(57) ABSTRACT

An output shaft bearing portion which is provided in an extension housing to be attached to an outside of an end wall portion of a casing main body of a transmission casing is lubricated by lubrication oil which is supplied to lubricating portions inside the casing main body. In the end wall portion there is formed an oil guide passage which guides the lubrication oil supplied to the lubricating portions inside the casing main body. Inside the extension housing, there is formed a rib which guides the lubrication oil flown from the oil guide passage, into a position in which the lubrication oil can be scraped by a gear wheel provided inside the extension housing. The lubrication oil scraped by the gear wheel is supplied to the output shaft bearing portion.

3 Claims, 4 Drawing Sheets

LUBRICATING STRUCTURE FOR OUTPUT SHAFT BEARING PORTION IN TRANSMISSION

BACKGROUND OF THE INVENTION

1. Field of the Invention

The present invention relates to a lubricating structure for an output shaft bearing portion (i.e., a bearing portion of an output shaft) in a transmission such as an automatic transmission of a motor vehicle.

2. Description of Related Art

Conventionally, as a transmission for a motor vehicle, there has hitherto been known the following one. Namely, the transmission is made up of an extension housing which is attached to an axial outside of an end wall portion of a casing main body of a transmission casing. This extension housing is provided with an output shaft bearing portion for rotatably supporting an output shaft which protrudes or projects through the end wall portion. Inside the extension housing there is contained a gear wheel such as a parking gear wheel or a vehicle speed detection gear wheel which is coupled to the output shaft.

In this kind of transmission, however, lubrication oil is supplied to the output shaft bearing portion through an oil passage which is formed inside the output shaft (see Published Unexamined Japanese Patent Application No. 80816/1990).

In the above-described conventional transmission, it is necessary to form inside the output shaft an oil passage which extends close to, or to the neighborhood of, the output shaft bearing portion. This results in difficulty in securing the strength of the output shaft.

In view of the above-described point, the present invention has an object of providing a lubrication structure in which the output shaft lubricating portion can be lubricated without forming, inside the output shaft, an oil passage for lubricating the output shaft bearing portion.

SUMMARY OF THE INVENTION

In order to attain the above and other objects, according to the present invention, there is provided a lubricating structure for an output shaft bearing portion in a transmission, comprising: an extension housing which is attached to an axial outside of an end wall portion of a casing main body of a transmission casing; an output shaft bearing portion provided in the extension housing for rotatably supporting an output shaft which protrudes through the end wall portion; a gear wheel which is contained inside the extension housing and which is coupled to the output shaft, wherein the end wall portion has formed therein an oil guide passage for guiding lubrication oil supplied to a lubricating portion inside the casing main body into the extension housing, and wherein the extension housing has formed therein a rib for guiding the lubrication oil flowing from the oil guide passage into a position in which the lubrication oil can be scraped by the gear wheel so that the output shaft bearing portion is lubricated by the lubrication oil scraped by the gear wheel.

According to the present invention, the lubrication oil that has been supplied to the lubricating portion inside the casing main body is guided by the oil guide passage and the rib, and is subsequently scraped up or lifted by the gear wheel inside the extension housing for supplying to the output shaft bearing portion. It is thus not necessary to form inside the output shaft an oil passage for lubricating the output shaft bearing portion. The strength of the output shaft can, therefore, be easily secured.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
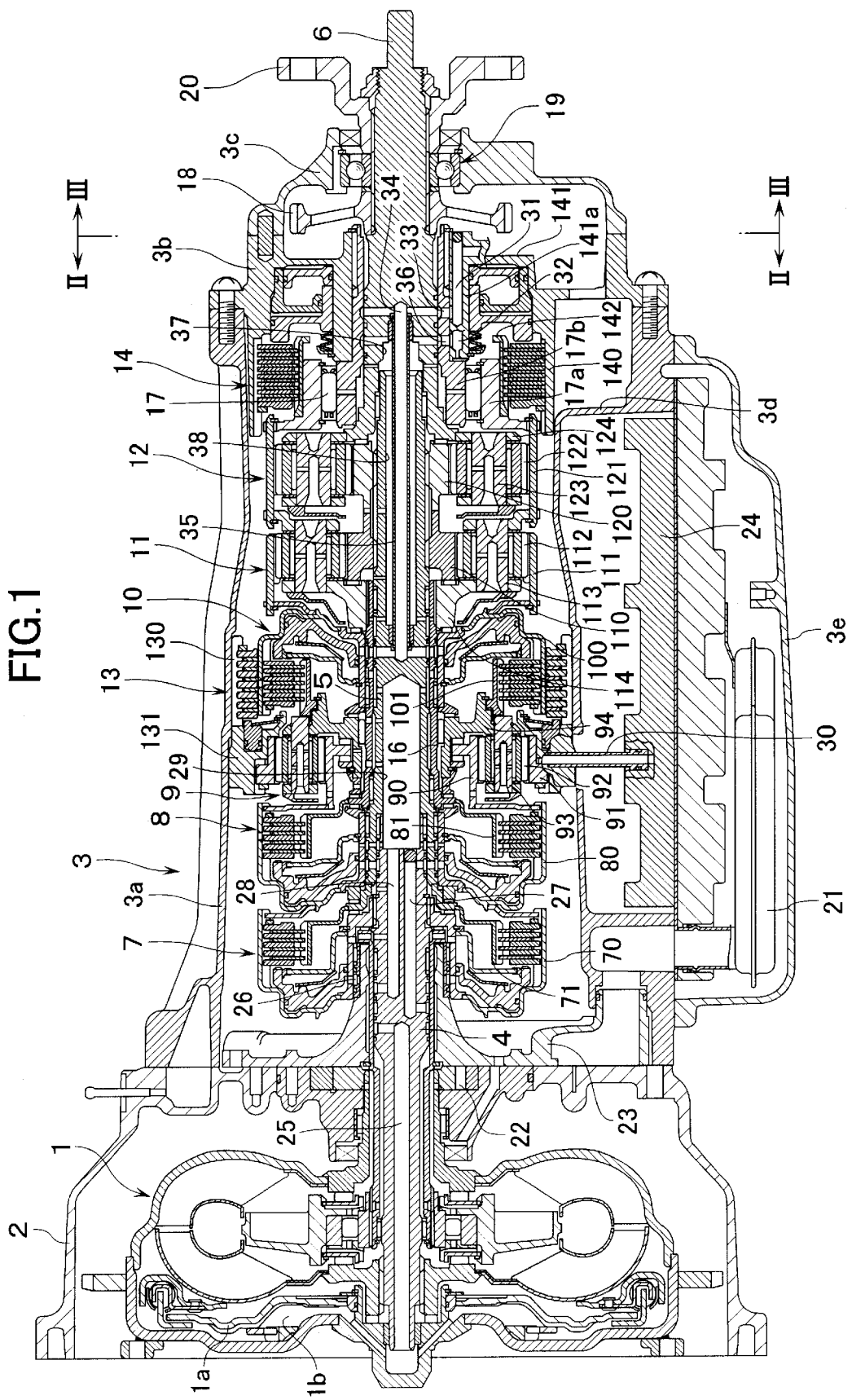
FIG. 1 is a vertical sectional view of a transmission in which the lubricating structure according to the present invention is employed.

FIG. 1 shows an automatic transmission for a motor vehicle. This transmission is provided with a transmission casing 3 which is coupled to a torque converter casing 2 containing therein a fluid torque converter 1 equipped with a lock-up clutch 1a. Inside this transmission casing 3, there are rotatably supported on the same axial line an input shaft 4 which is coupled to the fluid torque converter 1, an intermediate shaft 5, and an output shaft 6. Around these shafts 4, 5, 6, there are disposed in the order mentioned, as seen from the side of the torque converter casing 2, a first hydraulic clutch 7, a second hydraulic clutch 8, a first planetary gear mechanism 9, a third hydraulic clutch 10, a second planetary gear mechanism 11, and a third planetary gear mechanism 12. Further, there is disposed a first hydraulic brake 13 around the third hydraulic clutch 10, and a second hydraulic brake 14 is disposed at an axial front of the third planetary gear mechanism 12.

Each of the planetary gear mechanisms 9, 11, 12 is made up of: a sun gear 90, 110, 120; a ring gear 91, 111, 121; planetary pinions 92, 112, 122 which are in gearing mesh with the sun gear and the ring gear; and a carrier 94, 114, 124 which rotatably supports each of the planetary pinions through a pinion shaft 93, 113, 123.

The input shaft 4 has coupled thereto a clutch outer member 70 of the first hydraulic clutch 7. A clutch outer member 80 of the second hydraulic clutch 8 is coupled to said clutch outer member 70, and the sun gear 90 of the first planetary gear mechanism 9 is coupled to the clutch outer member 80 of the second hydraulic clutch 8. It is thus so arranged that the clutch outer members 70, 80 of the first and second hydraulic clutches 7, 8 and the sun gear 90 of the first planetary gear mechanism 9 can be rotated together with the input shaft 4. Further, a clutch inner member 71 of the first hydraulic clutch 7 is coupled to the sun gears 110, 120 of the second and third planetary gear mechanisms 11, 12 through the intermediate shaft 5. A clutch inner member 81 of the second hydraulic clutch 8 is coupled to a carrier 114 of the second planetary gear mechanism 11 through a sleeve 16 which is ratably supported on the intermediate shaft 5.

The ring gear 91 of the first planetary gear mechanism 9 is fixed to the transmission casing 3 through a cylinder portion 131 which is formed integrally with a brake outer member 130 of the first hydraulic brake 13. The carrier 94 of the first planetary gear mechanism 9 is coupled to a clutch inner member 101 of the third hydraulic clutch 10. A clutch outer member 100 of the third hydraulic clutch 10 is coupled to the ring gear 111 of the second planetary gear mechanism 11. The clutch outer member 100 is further arranged to be braked by the first hydraulic brake 13 relative to the transmission casing 3.

The carrier 114 of the second planetary gear mechanism 11 is coupled to the ring gear 121 of the third planetary gear mechanism 12. The ring gear 121 of the third planetary gear mechanism 12 is arranged to be braked by the second hydraulic brake 14 relative to the transmission casing 3, and is also coupled to the transmission casing 3 through a one-way clutch 17 which serves as a reaction force receiving member. The carrier 124 of the third planetary gear mechanism 12 is coupled to the output shaft 6.

According to the above-described arrangement, when the first hydraulic clutch 7 and the second hydraulic brake 14 are engaged, the first speed transmission train is established. When the first hydraulic clutch 7 and the first hydraulic brake 13 are engaged, the second speed transmission train is established. When the first hydraulic clutch 7 and the third hydraulic clutch 10 are engaged, the third speed transmission train is established. When the first hydraulic clutch 7 and the second hydraulic clutch 8 are engaged, the fourth speed transmission train is established. When the second hydraulic clutch 8 and the third hydraulic clutch 10 are engaged, the fifth speed transmission train is established. When the second hydraulic clutch 8 and the first hydraulic brake 13 are engaged, the sixth speed transmission train is established. When the third hydraulic clutch 10 and the second hydraulic brake 14 are engaged, the reverse transmission train is established. In this manner, the speed changing of six stages of forward running and one stage of reverse running can be performed.

The transmission casing 3 is made up of: a casing main body 3a; an end piece 3b which constitutes that end wall portion of the casing main body 3a which is opposite to the torque converter casing 2; and an extension housing 3c which is attached to an axial outside of the end piece 3b. A brake outer member 140 and a cylinder portion 141 of the second hydraulic brake 14 are integrally formed in the end piece 3b. A brake inner member 142 of the second hydraulic brake 14 is coupled to an outer race 17a of the one-way clutch 17 which is coupled to the ring gear 121 of the third planetary gear mechanism 12. Further, an inner race 17b of the one-way clutch 17 is fitted into an inner cylinder portion 141a of a cylinder portion 141 of the second hydraulic brake 14 to thereby fix the inner race 17b to the end piece 3b. The output shaft 6 is rotatably supported by inserting the output shaft 6 through the inner race 17b. A parking gear wheel 18 which is coupled to the output shaft 6 is thus contained inside the extension hocusing 3c. The extension housing 3c is further provided with an output shaft bearing portion 19 for rotatably supporting the output shaft 6 which is inserted through the output shaft bearing portion 19. An output flange 20 is coupled to an outer end portion of the output shaft 6 which protrudes axially outward of the extension housing 3c through the bearing portion 19.

On an outside lower portion of the casing main body 3a, there is provided an oil pan 3e through a skirt portion 3d which is integrally formed on an outer surface of the casing main body 3a so as to extend downward. In addition, on that end portion of the torque converter casing 2 which is on the side of the transmission casing 3, there is provided a pump 22 which suctions oil inside the oil pan 3e through a strainer 21. Further, on that end portion of the casing main body 3a which is on the side of the torque converter casing 2 as well as inside the oil pan 3e, there are provided valve blocks 23, 24 which have assembled therein those various valves inside the hydraulic circuit which are respectively coupled to the pump 22.

From the valve block 23 inside the casing main body 3a, the oil is supplied to: a back pressure chamber 1b of the lock-up clutch 1a through an oil hole 25 formed in the input shaft 4; a cylinder portion of the first hydraulic clutch 7 through an oil groove 26 on an outer circumference at the end portion of the valve block 23 which is inserted into an inner circumference of the first hydraulic clutch 7; and a cylinder portion of the second hydraulic clutch 8 through an oil hole 27 formed in the input shaft 4. The oil is also supplied to lubricating portions around the input shaft 4 and around the intermediate shaft 5 through an oil hole 28 formed in the input shaft 4 and through that oil hole 29 inside the intermediate shaft 5 which is communicated with the oil hole 28.

From the valve block 24 inside the oil pan 3e, the oil is supplied to the cylinder portion 131 of the first hydraulic brake 13 through a pipe 30, and is also supplied to the cylinder portion 141 of the second hydraulic brake 14 through a pipe (not illustrated). In addition, the end piece 3b has formed therein that oil passage 31 for the third hydraulic clutch 10 which is connected to the valve block 24 through a pipe (not illustrated), as well as an oil passage 32 for lubricating purpose. These oil passages 31, 32 are formed in a manner to reach the inner cylinder portion 141a of the cylinder portion 141 of the second hydraulic brake 14. The oil is thus supplied from the oil passage 31 to the cylinder portion of the third hydraulic clutch 10 through an oil hole 33 which is formed in the inner race 17b, an oil hole 34 which is formed in the output shaft 6, and through an inside-shaft pipe 35 between the output shaft 6 and the intermediate shaft 5. The oil is further supplied from the oil passage 32: to the lubricating portions around the output shaft 6 through an oil hole 36 which is formed in the inner race 17b and through an oil passage 37 inside the output shaft 6; and to the lubricating portions around the intermediate shaft 5 through that oil passage 38 inside the intermediate shaft 5 which is communicated with the oil passage 37. Still furthermore, the oil is supplied from the oil passage 32 to that disc portion of the second hydraulic brake 14 which is a lubricating portion outside the one-way clutch 17, through an oil groove 39 (see FIG. 4) at an end surface of the above-described inner cylinder portion 141a.

Figure 2:
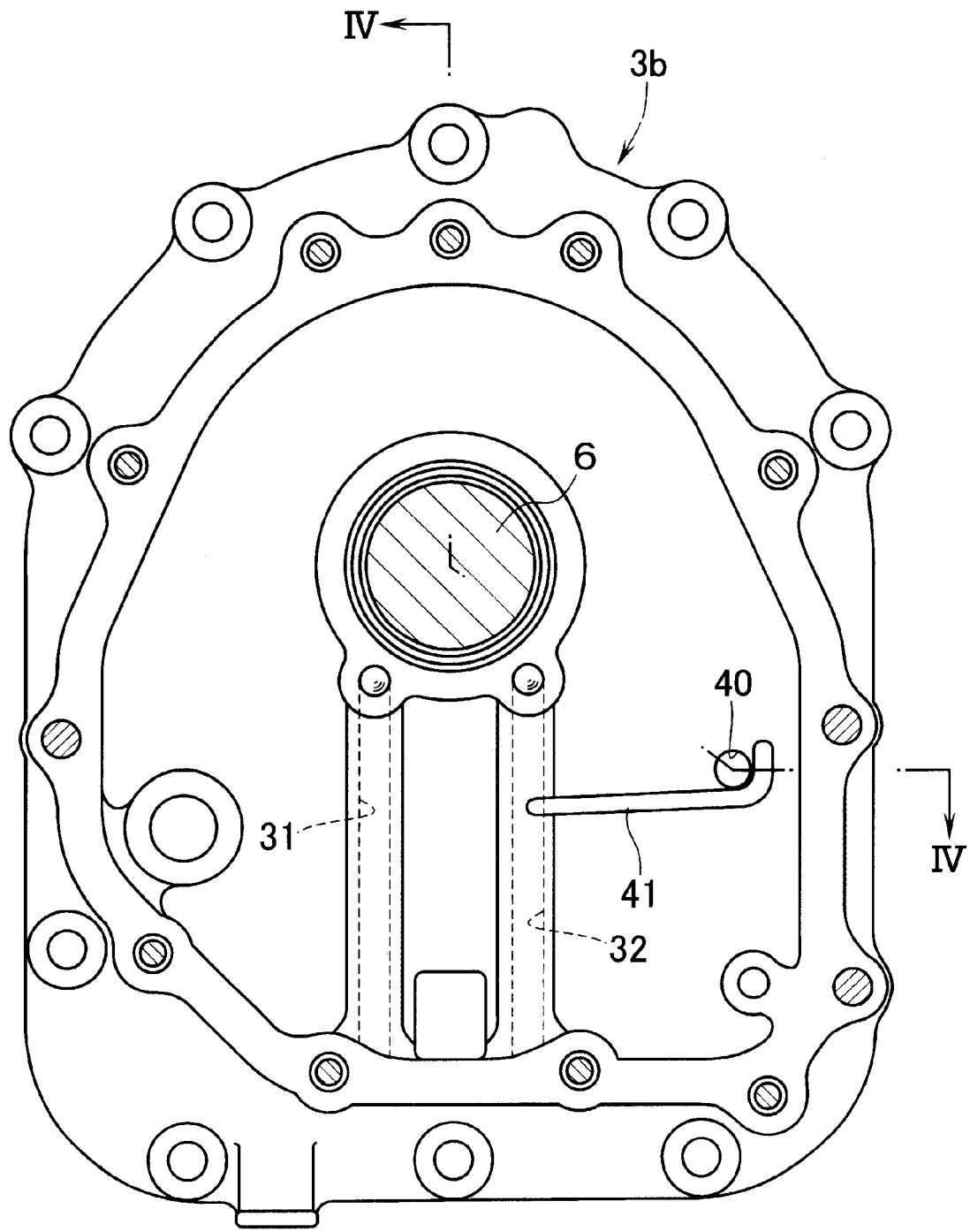
FIG. 2 is a sectional view taken along the line II—II in FIG. 1.
Figure 3:
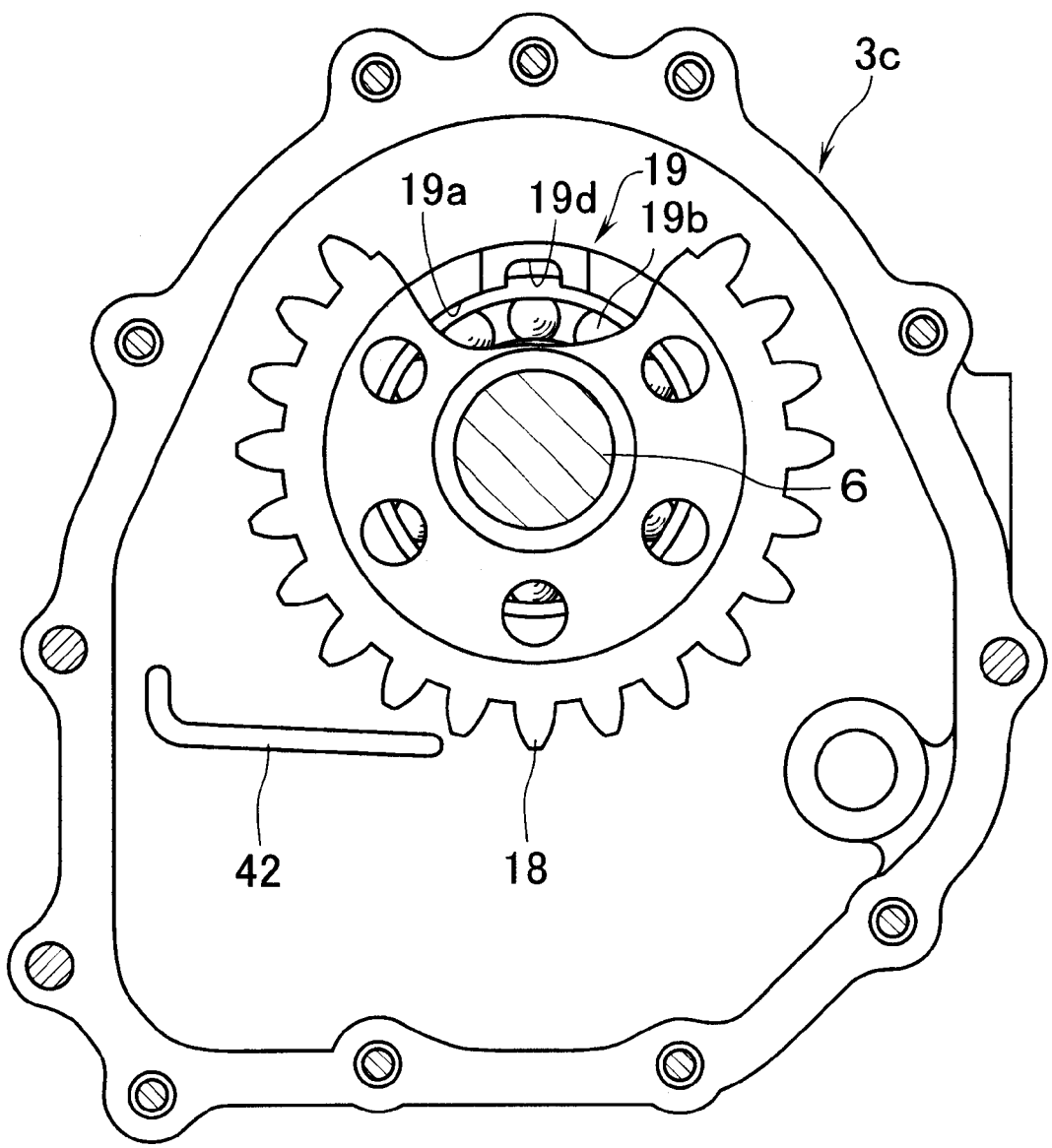
FIG. 3 is a sectional view taken along the line III—III in FIG. 1.
Figure 4:
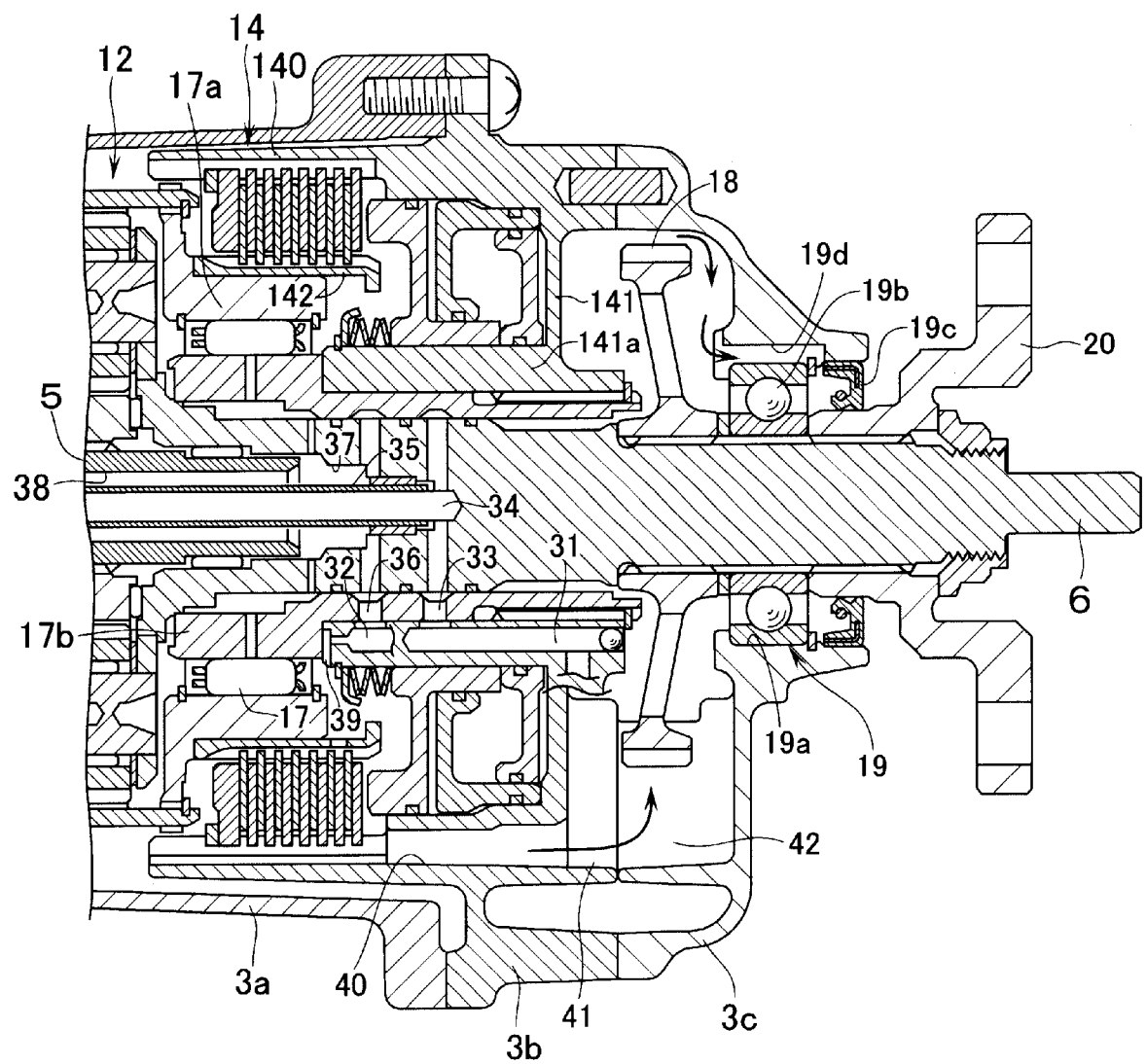
FIG. 4 is a sectional view taken along the line IV—IV in FIG. 2.

With reference to FIGS. 2 through 4, the end piece 3b has formed therein an oil guide passage 40 for guiding or introducing into the extension housing 3c the lubrication oil which has reached the brake outer member 140 by passing through the disc portion of the second hydraulic brake 14. Further, there are formed: on an outer side surface of the end piece 3b, a rib 41 for receiving the lubrication oil which flows from the oil guide passage 40; and on an inner side surface of the extension housing 3c, a rib 42 which is disposed in an end-to-end relationship with the rib 41. It is thus so arranged that the lubrication oil which has flown from the oil guide passage 40 is guided into a position close to, or in the neighborhood of, the lower outer periphery of the parking gear 18 through the rib 41 and the rib 42 for further being scraped or lifted by the parking gear wheel 18.

The lubrication oil scraped by the parking gear wheel 18 is supplied to the output shaft bearing portion 19 along the upper inner surface of the extension housing 3c to thereby perform the lubrication of the bearing portion 19. Here, the output shaft bearing portion 19 is made up by mounting, into a central hole 19a of the extension housing 3c, a bearing 19b and an oil seal 19c on an axial outside of the bearing 19b. A recessed groove 19d is formed in an upper wall portion of the central hole 19a. It is thus so arranged that the lubrication oil which flows down along the upper inner side surface of the extension housing 3c flows into a space between the bearing 19b and the oil seal 19c through the recessed groove 19d. The bearing 19b and the sliding portion on an inner circumference of the oil seal 19c are thus well lubricated.

An explanation has so far been made about an embodiment in which the parking gear wheel 18 is contained inside the extension housing 3c. However, the present invention can also be applied to an embodiment in which a vehicle speed detecting gear is contained inside the extension housing 3c.

As can be seen from the above explanation, according to the present invention, the output shaft bearing portion which is provided in the extension housing can be lubricated by the lubrication oil which is supplied to the lubricating portions inside the casing main body. Therefore, there is no need of forming in the output shaft an oil passage for lubricating the output shaft bearing portion. The strength of the output shaft can therefore be easily secured.

It is readily apparent that the above-described lubricating structure for an output shaft bearing portion meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A lubricating structure for an output shaft bearing portion in a transmission, comprising:
    an extension housing which is attached to an axial outside of an end wall portion of a casing main body of a transmission casing;
    an output shaft bearing portion provided in said extension housing for rotatably supporting an output shaft which protrudes through said end wall portion;
    a gear wheel which is contained inside said extension housing and which is coupled to said output shaft,
    wherein said end wall portion has formed therein a lubrication oil passage which supplies a lubricating portion with lubrication oil in said casing main body, and an oil guide passage for guiding the lubrication oil supplied to the lubricating portion inside said casing main body from said casing main body directly into said extension housing without returning the lubrication oil to an oil pan, and
    wherein said extension housing has formed therein a rib for guiding the lubrication oil flowing from said oil guide passage into a position in which the lubrication oil can be scraped by said gear wheel so that said output shaft bearing portion is lubricated by the lubrication oil scraped by said gear wheel.

2. The lubricating structure for an output shaft bearing portion in a transmission according to claim 1, wherein said rib is formed by a rib formed at the end wall portion and a rib formed on a an inner side surface of the extension housing, which ribs are in an end-to-end relationship.

3. The lubricating structure for an output shaft bearing portion in a transmission according to claim 1, wherein said lubricating portion is a hydraulic brake which is disposed adjacently to said end wall portion.

* * * * *